Aug. 16, 1938.  J. J. STONER  2,126,838

CLEANING DEVICE FOR BURNER TIPS

Filed Jan. 13, 1937

Inventor

John J. Stoner

By Robert A. Lavender

Attorney

Patented Aug. 16, 1938

2,126,838

UNITED STATES PATENT OFFICE 2,126,838

CLEANING DEVICE FOR BURNER TIPS

John J. Stoner, Bremerton, Wash.

Application January 13, 1937, Serial No. 120,383

2 Claims. (Cl. 158—120)

(Granted under the act of March 3, 1883, as amended April 30, 1928; 370 O. G. 757)

My invention relates to improvements in mechanical devices for cleaning burner tips, more particularly fuel oil burner tips.

An important object of this invention is to provide a device that may be used to clean effectively and expeditiously the inner surface of the burner tip, as well as the opening in the burner tip through which the inflammable mixture flows into the combustion chamber.

A further object of the invention is to provide such a device as may be contained within the assembled burner and which may be used for cleaning the burner tip without its removal from the boiler.

Other objects and advantages of the invention will be apparent during the course of the following description.

In the accompanying drawing, forming a part of this specification and in which like numerals are employed to designate like parts throughout same, Fig. 1 is a central longitudinal section of a steam atomized oil burner incorporating my invention;

Figures 1, 2, 3, 4, 5:
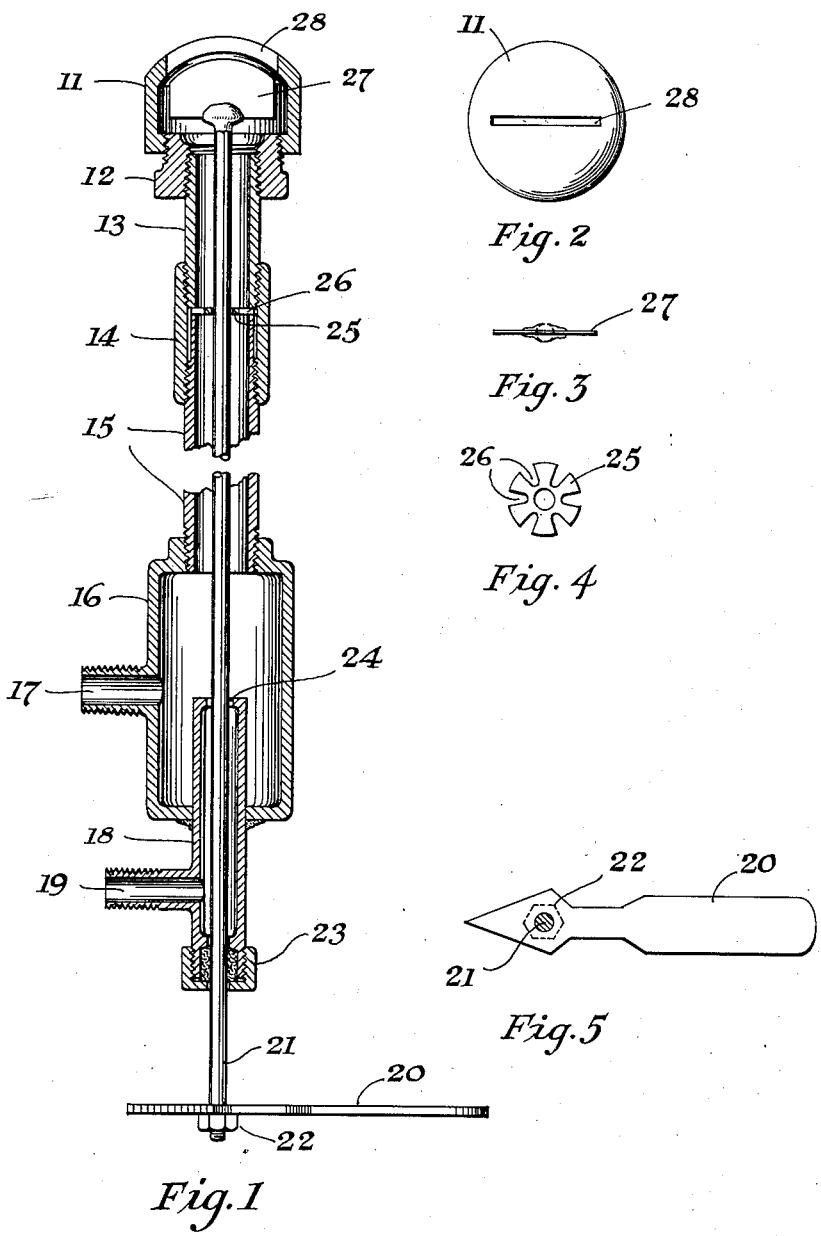
Fig. 2 is an end view of the burner tip.
Fig. 3 is an end view of the cleaner spud.
Fig. 4 is an end view of the cleaning rod guide.
Fig. 5 is a top view of the cleaning rod indicator.

In the drawing, wherein for the purpose of illustration of a preferred embodiment of my invention, there is shown a conventional type steam atomized fuel oil burner assembly consisting of a burner tip 11, a bushing 12, a nipple 13, a coupling 14, a pipe 15, a mixing chamber 16 with an oil inlet 17; and a steam chamber 18 with a steam inlet 19; in which is mounted my invention consisting of a cleaning spud 27, cleaning rod 21 and operating and indicator handle 20. The cleaning rod 21 passes longitudinally through the burner assembly, being supported by a packing gland 23 and a guide 25, and terminates in a cleaning spud 27. The inner end of the steam chamber is drilled over size at 24 to permit the steam to pass around the cleaning rod 21 and into the mixing chamber 16. The guide 25 is held in position between the pipe 15 and the nipple 13, or may be inserted in the burner assembly in any conventional manner. The guide 25 is slotted as shown at 26 in Fig. 4 to permit the flow of the fluid through the burner assembly. The cleaning spud 27 is shaped for the particular type burner tip with which it is to be used so that the outer edge of the spud is of the same contour as that of the inner surface of the burner tip 11. The spud 27 is also of such construction in width and thickness that it will fit within the slot 28 of the burner tip 11 leaving space enough around the spud 27 to allow sufficient fluid to flow and thus keep the fire burning during the cleaning operation.

The operation of the cleaning device is as follows:

To clean the inner side of the burner tip 11, the cleaning rod 21 is pushed in by means of the indicator handle 20 until the cleaning spud 27 comes in contact with the inner surface of the burner tip. The handle is then rotated several times. This movement imparted through the cleaning rod 21 will result in a scraping action on the inner surface of the burner tip and will cause any foreign matter, such as solidified carbon attached to the surface, to become disengaged and be carried out through the slot 28 in the stream of the inflammable mixture.

When it is desired to clean the slot 28 of the burner tip 11, it is only necessary to turn the cleaning rod 21 until the cleaning spud 27 is parallel to the slot 28. This position may be previously predetermined and a locating reference mark may be inscribed at some convenient place, such as the boiler front, so that a pointed end of the indicator handle points to this mark when the cleaning spud is in its proper location. With the cleaning device in such a position the cleaning rod 21 is then pushed in. This motion forces the cleaning spud 27 through the opening 28 of the burner tip 11 and causes the cleaning spud 27 to scrape any foreign matter from within the slot 28.

It is to be understood that the form of my invention, herewith shown and described, is to be taken as a preferred example of the same, and that various changes in the shape, size and arrangement of parts may be resorted to, without departing from the spirit of my invention or the scope of the appended claims.

The invention described herein may be manufactured and used by or for the Government of the United States of America for governmental purposes without the payment of any royalties thereon or therefor.

Having thus set forth and disclosed the nature of my invention, what is claimed is:

1. For use with a hollow fluid fuel burner tip having a concave inner surface and a diametrical fuel slot therethrough, a tip cleaning flat blade having a cleaning edge slightly smaller than the fuel slot and insertable within the fuel slot to clean the same without completely blocking the flow of fuel therethrough, the cleaning edge of said blade being curved in shape to conform to the inner concave surface of said burner tip, and means connected at one end to said blade extending through and exteriorly of said tip for operating said blade to clean the inner concave surface of said tip and said slot while the tip is in active service.

2. For use with a hollow fluid fuel burner tip having a concave inner surface and a diametrical fuel slot therethrough, a tip cleaning flat blade having a cleaning edge slightly smaller than the fuel slot and insertable within the fuel slot to clean the same without completely blocking the flow of fuel therethrough, the cleaning edge of said blade being curved in shape to conform to the inner concave surface of said burner tip, and means connected at one end to said blade extending through and exteriorly of said tip for operating said blade to clean the inner concave surface of said tip and said slot while the tip is in active service, said means including a rod slidably and rotatably extending into the tip from the exterior thereof, and indicating means on the other end of said rod exterior of the tip showing the angle of the blade relative to the slot.

JOHN J. STONER.